United States Patent [19]
Lee

[11] Patent Number: 5,892,769
[45] Date of Patent: Apr. 6, 1999

[54] METHOD AND SYSTEM FOR PRIORITIZED MULTIPLE ACCESS USING CONTENTION SIGNATURES FOR CONTENTION-BASED RESERVATION

[75] Inventor: Whay Chiou Lee, Cambridge, Mass.

[73] Assignee: Motorola Inc., Schaumburg, Ill.

[21] Appl. No.: 704,042

[22] Filed: Aug. 28, 1996

[51] Int. Cl.$^6$ ................................................ H04L 12/413
[52] U.S. Cl. ........................................................ 370/447
[58] Field of Search .................................. 370/442, 443, 370/444, 447, 329, 337, 341, 343, 344, 347, 348, 431, 461, 462

[56] References Cited

U.S. PATENT DOCUMENTS

| | | | |
|---|---|---|---|
| 5,241,601 | 8/1993 | Naito et al. | 370/447 |
| 5,307,347 | 4/1994 | Duault et al. | 370/447 |
| 5,384,777 | 1/1995 | Ahmudi et al. | 370/447 |
| 5,553,072 | 9/1996 | Daggett et al. | 370/447 |
| 5,572,517 | 11/1996 | Safadi | 370/347 |
| 5,636,223 | 6/1997 | Reardon et al. | 370/431 |
| 5,651,009 | 7/1997 | Perreault et al. | 370/447 |

OTHER PUBLICATIONS

R. G. Gallager, "A Perspective on Multaccess Channels", IEEE Trans. on Information Theory, vol. 1T,–31, No. 2, Mar. 1985.

H. W. Lee and J. W. Mark, "Combined Randon/Reservation Access for Packet Switched Transmission Over a Satellite with On–Board Processing: Part 1—Global Beam Sattelite", IEEE Trans. on Communications, vol. COM–31, No. 10, Oct. 1983.

J. I. Capetanakis, "Generalized TDMA: The Multi–Accessing Tree Protocol", IEEE Trans on Communications, vol. COM–27, No. 10, Oct. 1979.

G. Fayolle, P. Flajolet, M. Hofri, and P. Jacquet, "Analysis of a Stack Algorithm for Random Multiple–Access Communication", IEEE Transactions on Information Theory, vol. IT–31, No. 2, Mar. 1985.

J. W. Mark, "Distributed Scheduling Conflict–Free Multiple Access for Local Area Communications Networks", IEEE Trans. on Communications, vol. COM–28, No. 12, Dec. 1980.

I. Chlamtac, A. Ganz, and Z. Koren, "Proritized Demand Assignment Protocols and Their Evaluation", IEEE Trans. on Communications, vol. 36, No. 2, Feb. 1988.

I. Chlamtac and A. Farago, "Making Transmission Schedules Immune to Topology Changes in Multi–Hop Packet Radio Networks", IEEE/ACM Trans. on Networking, vol. 2, No. 1, Feb. 1994.

M. Hu and J. Chang, "Collision Resolution algoritnms for CDMA Systems" IEEE J. on Selected Areas in Communications, vol. 8, No. 4, May 1990.

I. Cidon and M. Sidi, "The Effect of Capture on Collision–Resolution Algorithms", IEEE Trans. on communications, vol. Com–33, No. 4, Apr. 1985.

M. Sidi and I. Cidon, "Splitting Protocols in Presence of Capture" IEEE Trans. on Information Theory, vol. IT.31, No. 2, Mar. 1985.

W. Xu and G. Campbell, "A Distributed Queueing Random Access Protocol for a Broadcast Channel", ACM SIGCOMM '93, Sep., 1993.

C. Ruzczyk and L. Gun, "Device, Router, Method and System for Providing a Hybrid Multiple Access Protocol for Users with Multiple Priorities", Patent Application, Serial No. 08/526,295, File Date: Sep. 11, 1995, Motorola Inc. Docket No. CX095022.

*Primary Examiner*—Ajit Patel
*Attorney, Agent, or Firm*—Darleen J. Stockley

[57] ABSTRACT

The present invention provides a method (300) and system (200) of contention-based multiple access for the reservation subchannel to support a large population of users with diverse QoS requirements wherein users are permitted to transmit reservation messages in reservation slots in a coordinated manner to contend for the privilege to transmit data messages in the data slots. In the event of a collision in the reservation slots, a prioritized contention resolution algorithm is used to resolve the collision.

7 Claims, 4 Drawing Sheets

METHOD AND SYSTEM FOR PRIORITIZED MULTIPLE ACCESS USING CONTENTION SIGNATURES FOR CONTENTION-BASED RESERVATION

FIELD OF THE INVENTION

The present invention relates generally to prioritized multiple access to networks and more particularly, to a reservation mechanism that is a contention-based multiple access protocol.

BACKGROUND OF THE INVENTION

In today's integrated communication networks, such as Asynchronous Transfer Mode (ATM) networks, which support a diversity of applications (e.g., data, voice, video, etc.), allocation of network resources is based on quality of service (QoS) requirements associated with the applications. Network demand is often divided into a number of service categories, such as constant bit rate (CBR) service, available bit rate (ABR) service, etc. One can consider network users to be divided into a plurality of priority classes, whereby different classes of users may require different levels of QoS. For example, some users may generate steady streams of messages while others may generate messages in a bursty manner.

A multiple access protocol is a mechanism that is used to allocate transmission resources (e.g., time slots and frequency bands) for user data transmission in a communication channel among a plurality of users. The terminology "user data" or simply "data" is used herein generically to refer to various kinds of user information including not only data, but also voice, video, etc. User data is distinguished from control information that the network generates to enable proper operation of network protocols.

A multiple access protocol may be contention-free or contention-based. A contention-free multiple access protocol apportions available transmission resources into non-overlapping segments and assigns one segment exclusively to each user. A contention-based multiple access protocol allows multiple users to simultaneously transmit messages to access the channel, and resolve collisions after they have occurred.

In contention-free multiple access protocols, the assignment of resource segments can be on a fixed basis or on a demand basis. In the fixed assignment approach, such as time-division multiple access (TDMA) and frequency-division multiple access (FDMA), resources allocated to a user are wasted when the user has nothing to transmit. Thus, these protocols are not efficient for networks that support a large population of users who are idle some of the time. In general, although fixed assignment multiple access schemes are very simple, they are not very efficient in networks supporting integrated services, especially when some services tend to generate messages in a bursty manner. Nonetheless, fixed assignment multiple access protocols generally perform well when the network is heavily loaded with a steady stream of user data from each user. In the demand assignment approach, a user either relinquishes its allocated resources when they are not needed (e.g., token passing), or reserves required resources when they are needed. A fraction of the channel is sometimes used for exchanging control information to support a reservation mechanism so that transmission of user data may be scheduled to avoid collisions. This reservation subchannel itself requires a multiple access protocol for coordinating transmission of reservation messages.

In contention-based multiple access protocols, there are two existing approaches to dealing with collisions. The terms "collision" and "contention" are used interchangeably herein. In one approach, each user that has been involved in a collision retransmits his message after some random amount of time. In another approach, a contention resolution algorithm is used to determine when the users who are involved in a collision may subsequently retransmit their messages, and meanwhile, all users that are not involved in the collision must wait until the collision is resolved. Contention-based multiple access protocols are known to have poor performance when the network is heavily loaded, as there can be many wasteful collisions. Nonetheless, when the network is lightly loaded, these protocols generally offer better performance than fixed assignment multiple access protocols. Since transmission resources are not divided among users a priori, these protocols are quite suitable for networks that support a large population of users, provided that only a small subset of the users are busy at any time.

Prior art has shown a combined random/reservation multiple access (CRRMA) scheme, in which transmission of reservation messages by a large population of bursty users utilizes a random access strategy. In this approach, a contention-based protocol is used for transmission of reservation messages in a reservation subchannel. Each data slot in a data subchannel is either reserved for a particular user or open for contention. The allocation of reserved data slots in the data subchannel is scheduled by a centralized scheduler.

In prior art for contention resolution, a splitting algorithm, known as the Binary Tree Splitting Algorithm (BTSA), is used to schedule retransmissions of messages after they have collided. The central idea of the original splitting algorithm is based on a concept of probabilistically splitting the set of users involved in a collision into a transmitting set and a nontransmitting set while making other users wait. Each of the two sets may contain zero, one, or more than one of the contending users. If by chance each of the two sets contains at most one user, then the contention is said to have been resolved. The user in the transmitting set, if any, would transmit first, and determine that he is successful. The user in the non-transmitting set, if any, would transmit next, and also determine that he is successful. If any of the two sets contains more than one user, then a collision will occur again. In this case, the set with contending users is subdivided into smaller transmitting and nontransmitting sets. In this respect, the splitting algorithm is recursive. The algorithm stops when each set contains at most one user. A splitting algorithm may be implemented with a stack.

The prior art includes Distributed Scheduling Multiple Access (DSMA) for scheduling multiple access transmissions. DSMA supports users belonging to different priority classes, but relies on distinct and serially transmitted user addresses to avoid collisions. DSMA also uses a data subchannel for transmission of data messages and a reservation subchannel for transmission of reservation messages. In this scheme, each user is assigned an n-bit address a priori (n being a predetermined integer). In the absence of priority scheduling, the system can accommodate up to $2^n-1$ users, numbered from 1 to $(2^n-1)$. Each user with data pending transmission transmits his unique address bits serially, with the most significant bit first, into the reservation subchannel. A reservation frame is completed when all users have received feedback regarding all the n reservation slots. The reservation subchannel is logically a simple OR circuit, such that the feedback in the reservation subchannel is binary (i.e., one may only distinguish between no transmission or at least one transmission of a bit of value 1 in each bit position of the serial address). A user with an address lower than that of another user in the same reservation frame temporarily discontinues further transmission in the reservation subchannel until a busy user with the higher address is identified. Each active user is guaranteed reservation for a data slot per reservation cycle, and a reservation cycle ends when every busy user has successfully placed a reservation for a data slot. To accommodate prioritized reservation, DSMA allows the first k (k<n) bits to be used to support $2^k$ priority classes, and the remaining (n–k) bits to be used as $2^{(n-k)}-1$ distinct addresses. Each user may choose to transmit a reservation message with any one of the $2^k$ priorities in a reservation frame by selecting appropriate bits for the first k serially transmitted bits. Since the first k bits are not unique among different users, they cannot reveal multiple users transmitting reservation messages with the same highest priority. The remaining (n–k) bits uniquely determines which user in a reservation frame has the highest priority. Note that it is guaranteed that no address is higher than one with (n–k) ones.

Some prioritized demand assignment protocols for a system consist of n stations generating messages of p different priority levels. A virtual network user is defined by a tuple (i, j) with $1 \leq i \leq n$ and $1 \leq j \leq p$. One protocol for implementing message priorities is to replicate the access mechanism for each priority. For example, an n-slot scheduling frame is repeated p times, with frames assigned to different priority levels in decreasing order. Another protocol allows access rights to be passed among all virtual users of different priorities in the same station before the virtual users for the next station. For example, a p-slot scheduling frame is repeated n times, with frames assigned to different stations. In a third protocol, known as the reservation scheduling protocol (RSP), messages are transmitted following two consecutive reservation/scheduling periods: a priority reservation period followed by a station reservation period. In each reservation cycle, up to p slots are dedicated to finding the highest priority message or messages present in the system. Since multiple such messages can arrive in a given priority reservation period, a station reservation period of up to n slots is used to determine which station among the contending stations will actually have a successful reservation.

Code Division Multiple Access (CDMA) techniques allow simultaneous transmission of several messages, using coded signals with low cross-correlation, such that capture is normally possible. Each user is either permanently assigned a fixed code or can each time randomly select a code from a predetermined code book containing a set of orthogonal codes. Time Spread Multiple Access (TSMA), based on assigning unique orthogonal code words generated from a Galois field, is an example of a CDMA type protocol with a fixed code assignment per user. When permanent code assignment is used, with one distinct code per group (e.g., priority class) of users, a collision occurs in a transmission cycle when two or more users belonging to the same group transmit their messages. When random code assignment is used, a collision occurs in a transmission cycle when two or more users happen to have selected the same code from the code book. In the prior art, a splitting algorithm is used for resolving collisions due to contending users having selected the same code.

The performance of a contention resolution algorithm based on binary tree splitting is improved when there is capture. The effect of capture in a contention-based multiple access protocol is taken advantage of to support users of different priority classes. Such a phenomenon is originally due to different levels of attenuation on transmissions from different geographically distributed users. The transmission that is originated by a transmitter closest to the receiver tends to have a higher power when it arrives at the receiver site than those originated by transmitter located further away. This transmission with the highest power is likely to dominate in a collision, and thus has a higher chance of being received successfully. By allowing users to select different levels of power for their transmissions, one may support users of different priority classes.

A common existing method for implementing priority classes in multiple access protocols is to partition a channel into multiple subchannels, and replicate for each priority class a multiple access mechanism in a separate subchannel. This approach is not efficient because the overhead for dynamic reallocation of transmission resources among priority classes is inevitably high. Common methods for partitioning a channel into subchannels include orthogonal segmentation in time, frequency, and both. In the case where both time and frequency segments are allowed, orthogonal codes are assigned to users of different priority classes to specify the time-frequency segments in which users of a given priority class are allowed to transmit messages. An example of such an approach is the well known code-division multiple access (CDMA) protocol where each priority class is assigned a unique orthogonal code.

Another existing method for implementing priority classes in multiple access protocols is to use a contention-free reservation subchannel to identify the highest priority busy user in the system so that this user may access the data subchannel first. The reservation mechanism typically involves two phases. A first phase is used to determine the highest priority class with at least a busy user, and a second phase is used to uniquely identify the user that is to be first granted access privilege. The second phase may be implemented with a round-robin schedule, or a prioritized schedule. Due to the application of a contention-free reservation mechanism, the method described above is not easily scalable, and hence is inefficient when there is a large population of bursty users.

There is a need for an efficient method and system that addresses the problem of multiple access for a large population of users divided among a predetermined number of priority classes, each requiring a possibly different level of QoS.

DETAILED DESCRIPTION OF A PREFERRED EMBODIMENT

The present invention presents a hybrid approach wherein a contention-based protocol is used for transmission of reservation messages in a reservation subchannel and a contention-free protocol is used for transmission of data messages in a data subchannel. In this way, when the network is lightly loaded, the data subchannel is efficiently utilized since the protocol does not have to apportion transmission resources to idle users who have not made any reservation. When the network is heavily loaded, the overhead due to collision of reservation messages is relatively low because reservation messages are considerably smaller than data messages.

The present invention relates to multiple access protocols for a communication system supporting many users who are divided into a plurality of priority classes. More specifically, the invention relates to multiple access protocols for a communication system with a reservation mechanism that is a contention-based multiple access protocol supporting many users who are divided into a predetermined number of priority classes, wherein in the event of a contention among multiple reservation messages transmitted by users of different priorities, higher priority users are favored over lower priority users, and if the contention is to be resolved, the higher priority users are favored.

The present invention introduces a method and system for prioritized multiple access, whereby a contention-based protocol is used for transmission of reservation messages in a reservation subchannel and a contention-free protocol is used for transmission of data messages in a data subchannel. For clarity of presentation, the following describes a channel that is partitioned in the time domain into the reservation and data subchannels. Nonetheless, the invention is also applicable to systems utilizing other means of channel partitioning into reservation and data subchannels.

In a communication system with a broadcast medium, where time is divided into slots, the data subchannel utilizes data slots of a constant size. The reservation subchannel utilizes reservation slots of a possibly different constant size. Typically, the reservation slots are considerably smaller than the data slots. As described here, the data subchannel and the reservation subchannel interleave in time, such that the reservation slots are always scheduled in a group that consists of a fixed number of slots. The exact scheduling of data and reservation slots is beyond the scope of this invention.

The present invention provides a method and a system of contention-based multiple access for the reservation subchannel to support a large population of users with diverse QoS requirements. The users are permitted to transmit reservation messages in the reservation slots in a coordinated manner to contend for the privilege to transmit data messages in the data slots. In the event of a collision in the reservation slots, a prioritized contention resolution algorithm is used to resolve the collision.

A novel characteristic of the present invention is that there is no replication of the reservation mechanism for each priority class and inter-priority collision is permitted. An inter-priority collision is a collision that involves at least two users who belong to different priority classes. A prioritized contention resolution algorithm is used to resolve each inter-priority collision in favor of the highest priority class that is involved in the collision. When there is also an intra-priority collision, the algorithm proceeds to resolve the collision using an existing non-prioritized contention resolution algorithm. An intra-priority collision is a collision that involves two or more users of the same priority class.

Figure 1:
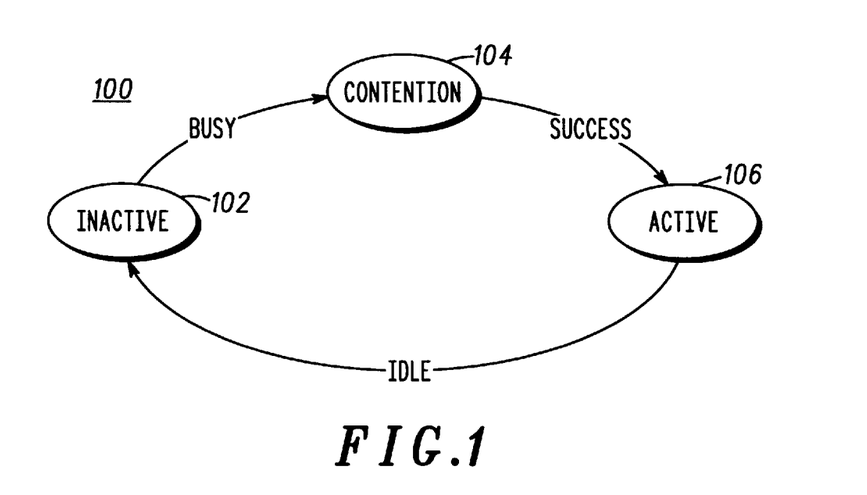
FIG. 1 is a state transition diagram showing state transitions of a user participating in contention-based multiple access in accordance with the present invention.

Each user is characterized by his state (see FIG. 1, numeral 100). A user is said to be in an INACTIVE state (102) when the user currently has no data message pending transmission. While in the INACTIVE state (102), the user may become busy (i.e., a data message has just been generated for transmission). When the user becomes busy, the user enters a CONTENTION state (104) by attempting, by means of contention, to reserve data slots for transmission of a data message. The user remains in the CONTENTION state (104) until a reservation message is successfully transmitted. At this time, the user enters an ACTIVE state (106). A predetermined scheduling algorithm is used to determine when each user in the ACTIVE state is allowed to transmit a data message in a data slot of the data subchannel. This scheduling algorithm is beyond the scope of the present invention. However, it is clear that selected control information may be included in each reservation message to support efficient scheduling decisions.

Where all users are divided into N priority classes and P[k] denotes a priority class associated with priority k with k=1, 2, 3, . . . N, such that 1 corresponds to the lowest priority and N the highest priority, a user is said to have a priority k where the user belongs to priority class P[k]. In accordance with the present invention, reservation slots are scheduled in groups of N slots, such that each active user may transmit a reservation message in these N slots according to a priority-dependent contention signature which is represented by an N-digit binary vector.

TABLE 1

| Priority Class P[k] | Contention Signature $S_1[k]S_2[k]\cdots S_n[k]\cdots S_{N-1}[k]\ S_{N-2}[k]\ S_N[k]$ |
|---|---|
| $P[2^N - 1]$ | 1 1 ·· 1 ·· 1 1 1 |
| · | · |
| · | · |
| · | · |
| P[2] | 0 0 ·· 0 ·· 0 1 0 |
| P[1] | 0 0 ·· 0 ·· 0 0 1 |

A group of N reservation slots is referred to as a reservation frame. The collection of information transmitted in all N reservation slots in a reservation frame constitutes a reservation message. Each priority class is assigned a unique contention signature, where each digit in the contention signature corresponds to a reservation slot in a reservation frame. A digit with value 1 in the contention signature means that the user transmits one bit of information in the corresponding reservation slot. A digit with value 0 means that the user transmits nothing in the corresponding reservation slot.

Where the contention signature assigned to priority class P[k] is represented by the vector $S[k]=(S_1[k], S_2[k], \ldots, S_N[k])$, according to the present invention, $S[k]$ is simply an N-digit binary vector whose corresponding decimal value is k (see Table 1). Hence, the invention can support $2^N-1$ priority classes (not counting the vector of all zeros).

The present invention operates in a broadcast medium. All users are able to detect a ternary feedback indicating the state of each reservation slot in a reservation frame (see Table 2). A ternary feedback indicates one of three possible outcomes within each reservation slot: an IDLE (i.e., no transmission), a SUCCESS (exactly one user has transmitted in the slot), and a COLLISION (i.e., at least two users have transmitted in the slot).

The present invention does not require the feedback with respect to a given reservation slot to be available to all users before contending users are allowed to transmit in subsequent reservation slots within the same reservation frame. It follows that the N reservation slots may be scheduled back-to-back, i.e., in a pipeline manner. In this respect, the performance of the present invention is robust in the presence of propagation delay. Note that since serial transmission is not required, the present invention is applicable even when the reservation subchannel is further sub-divided into N mini-channels, each supporting the transmission of one bit of the contention signature in a synchronized reservation frame.

TABLE 2

Ternary Feedback

| Number of Contending Users with $S_n[*] = 1$ | Feedback with respect to the $n^{th}$ Digit |
|---|---|
| 0 | Idle |
| 1 | Success |
| $\geq 2$ | Contention |

Where the collective state of the reservation slots in a reservation frame is represented by an N-digit ternary feedback vector, $F=(F_1, F_2, \ldots, F_N)$, such that each digit in F is 0 if the corresponding reservation slot is idle, 1 if there is one user transmitting a bit in the corresponding reservation slot, and X if there are two or more users transmitting their bits in the corresponding reservation slot, if all reservation slots in a reservation frame are idle, then it is obvious that no users are making a reservation for data slots.

In accordance with the present invention, whenever a user with a given priority transmits a reservation message in a reservation frame, the user has a good chance of surviving a collision due to simultaneous transmission of reservation messages by users of lower priorities, provided there are no contending users of equal or higher priorities. In this way, the higher the priority of a user, the higher the probability of the user's success in a reservation frame for contention. When a user has a successful transmission in spite of a collision, the user is said to have captured the channel, and the event is known as a capture.

TABLE 3

Intra-Priority Collision

| | Contention Signature | | | | | | | |
|---|---|---|---|---|---|---|---|---|
| User A | 1 | 0 | 1 | 0 | 1 | 1 | 0 | 1 |
| User B | 1 | 0 | 1 | 0 | 1 | 1 | 0 | 1 |
| Feedback Vector | X | 0 | X | 0 | X | X | 0 | X |

When two or more users belonging to the same priority class are involved in a collision, there is an intra-priority collision. Table 3 shows an example of an intra-priority collision between User A and User B, who have the same contention signature 10101101. The collision results in a feedback vector with an X in each position where the contention signature of the users has a one, and a zero in each position where the contention signature of the users has a zero.

TABLE 4

Inter-Priority Collision

| | Contention Signature | | | | | | | |
|---|---|---|---|---|---|---|---|---|
| User C | 1 | 0 | 1 | 0 | 1 | 1 | 0 | 1 |
| User D | 0 | 1 | 1 | 0 | 0 | 1 | 0 | 1 |
| Feedback Vector | 1 | 1 | X | 0 | 1 | X | 0 | X |

When two or more users belonging to different priority classes are involved in a collision, there is an inter-priority collision. Table 4 shows an example of an inter-priority collision between User C and User D, who have different contention signatures. User C has a contention signature 10101101. User D has a contention signature 01100101. In this example, User C has a higher priority than User D. The feedback vector consists of a combination of zeros, ones, and X's. Note that the most significant digit of the feedback vector is a one, and it is the first digit. Obviously, this can only come from exactly one user. Therefore, regardless of the number of users involved in this collision, one can tell from the feedback vector that the user with a contention signature having a one in the first digit must have a successful transmission. Although the identity of the successful user is known only to the user itself, the capture is clearly indicated by the feedback vector.

TABLE 5

Hidden Collision

| | Contention Signature | | | | | | | |
|---|---|---|---|---|---|---|---|---|
| User E | 1 | 0 | 0 | 1 | 0 | 0 | 1 | 0 |
| User F | 0 | 0 | 1 | 0 | 1 | 1 | 0 | 0 |
| Feedback Vector | 1 | 0 | 1 | 1 | 1 | 1 | 1 | 0 |

Table 5 shows another example of an inter-priority contention between User E and User F. User E has a contention signature 10010010. User F has a contention signature 00101100. It is interesting to note that the feedback vector consists of zeros and ones only. But, there is indeed a collision in disguise. A user who has not been involved in the collision can easily misinterprets this as a successful transmission from a user whose contention signature is the same as the feedback vector 10111110. In this example, although User E has captured the channel, not all users can detect this capture. Such a phenomenon could happen because the union of the contention signatures of two or more contending users can form a contention signature that corresponds to the priority class of a non-contending user.

In accordance with the present invention, a variation of an existing splitting algorithm is used for contention resolution. Specifically, a splitting algorithm based on priorities is used to resolve inter-priority collisions, and a conventional splitting algorithm based on random splitting is used to resolve intra-priority collisions. Other existing contention resolution algorithms may also be used to resolve intra-priority collisions, but are not considered here in view of obvious extensions.

In the original splitting algorithm, random splitting is used to schedule retransmissions of messages after collisions. While a collision among some users is being resolved, all other users must refrain from transmission until the current collision is resolved. The central idea of the original splitting algorithm is based on a concept of probabilistically splitting the set of users involved in a collision into a transmitting set and a non-transmitting set. Each of the two sets of users may contain zero, one, or more than one of the contending users. If by chance each of the two sets contains at most one user, then the collision is said to have been resolved. The user in the transmitting set, if any, would retransmit first, and determine that the transmission was successful. The user in the non-transmitting set, if any, would retransmit next, and also determine that its transmission was successful. If any of the two sets contains more than one user, then a collision will occur again. In this case, the set with contending users is subdivided into smaller transmitting and non-transmitting sets. In this respect, the splitting algorithm is recursive. The algorithm stops when each set contains at most one user. The recursive splitting of the contending users may be represented by a binary tree data structure. Hence, the original splitting algorithm is often referred to as a binary tree splitting algorithm.

The binary tree splitting algorithm may be implemented with a stack. In each time slot, if the stack is not empty, the group that is on the top of the stack is popped off the stack, and contending users belonging to this group are permitted to transmit in the time slot. Whenever there is a collision, and the users involved in the collision are split into a transmitting group and a non-transmitting group, the non-transmitting group is pushed onto the stack before the transmitting group. If there is no collision, another group is popped off the stack for processing until the stack is empty.

In accordance with the present invention, a feedback vector F is a string of ternary digits, each taking on one of values 0, 1, and X (e.g., 001XX10X). The most significant digit of F may be either a 1 (e.g., 0010X1X0) or an X (e.g., 000X01XX). The feedback vector must consist of at least one nonzero digit if at least one user transmits a reservation message in a reservation frame.

When the most significant digit of a feedback vector has a value 1, every user knows that the user who is responsible for the transmission associated with this digit is the successful user. The identity of the successful user may not be known to all users, but the one who is successful knows that he is the successful user. It is clear in this case that there is only one contending user in the top half priority classes when the contending users are split into two groups such that one group contains contending users with contention signatures whose most significant digit is the same as the most significant digit of the feedback vector, and the other group contains contending users with contention signatures whose most significant digit is less significant than that of the feedback vector. The successful user captures the channel, and contention resolution proceeds with the remaining segment of the feedback vector. Contention resolution is needed only for the remaining contending users if there are any.

When the most significant digit of the feedback vector has a value X, then the contending users with the highest priority must have a contention signature with the most significant digit in the same vector position as the most significant digit of the feedback vector. The system must then proceed to a contention resolution to identify the contending users with the highest priority. The contending users are split into two groups such that one group contains contending users with contention signatures whose most significant digit is in the same vector position as the most significant digit of the feedback vector, and the other group contains contending users with contention signatures whose most significant digit is less significant than that of the feedback vector. The first group, containing contending users of higher priorities, will first proceed with further contention resolution. Should there be another collision, it must be resolved first before the other group proceeds with retransmissions. The algorithm is recursive, and stops when each divided group contains at most one user.

A transmitting group, which is the group of users that are permitted to transmit in a given reservation frame, is represented by a vector whose entries take on values 0, 1, or Y. Any user whose contention signature has zeros and ones that match those in the transmitting group vector may transmit in the given reservation frame. A digit of value Y in the transmitting group vector means that the digit may be matched by either a zero or a one. For example, a transmitting group vector 01YY may be matched by contention signatures 0100, 0101, 0110, and 0111.

Where a transmitting group is represented by a transmitting group vector $G=(G_1, G_2, \ldots, G_N)$, a typical transmitting group vector consists of a contiguous string of leading digits of 1's and 0's, followed by a contiguous string of trailing Y's and 0's (e.g., 011YY0YY). G is partitioned into two segments, such that $G=(G^r, G^u)$, where $G^r$ corresponds to the leading digits up to but not including the most significant Y, and $G^u$ corresponds to the remaining digits. For example, for $G=(0101Y0YY)$, $G^r=(0101)$ and $G^u=(Y0YY)$. $G^r$ is referred to as the resolved segment of G, and $G^u$ is referred to as the unresolved segment of G.

When a transmitting group is split into a transmitting subgroup and a non-transmitting subgroup, the original group is referred to herein as the parent group, and each subgroup as a child group. Where G' and G" represent the transmitting child group and non-transmitting child group respectively, it is necessary that G' and G" share with G the leading segment $G^r$. Let $G'=(G^r, G''')$, and $G''=(G^r, G'''')$. The present invention resolves a collision in the order of high to low priorities. As a prioritized contention resolution progresses, the resolved segment of G grows in length while the unresolved segment of G shrinks.

A feedback vector is partitioned, in the same manner as a transmitting group vector, into a resolved segment $F^r$ and an unresolved segment $F^u$, corresponding to $G^r$ and $G^u$ respectively. That is, $F=(F^r, F^u)$. Note that $F^r$ is not free of digits with value X.

For convenience, $D_1(V)$ is defined to be the first digit of a vector V, and a masking function, M(F), which maps a feedback vector F to a mask vector M as follows: $M=(M_1, M_2, \ldots M_N)$ such that $M_k=0$ if $F_k=0$, and $M_k=1$ otherwise. $G*M(F)$ means that the vector G is multiplied by the mask vector M, derived from the feedback vector F, digit by digit. The mask vector is partitioned, in the same manner as a transmitting group vector, into a resolved segment $M^r$ and an unresolved segment $M^u$, corresponding to $G^r$ and $G^u$ respectively. Thus, $M=(M^r, M^u)$. Note that $M^r=G^r$.

Figure 2:
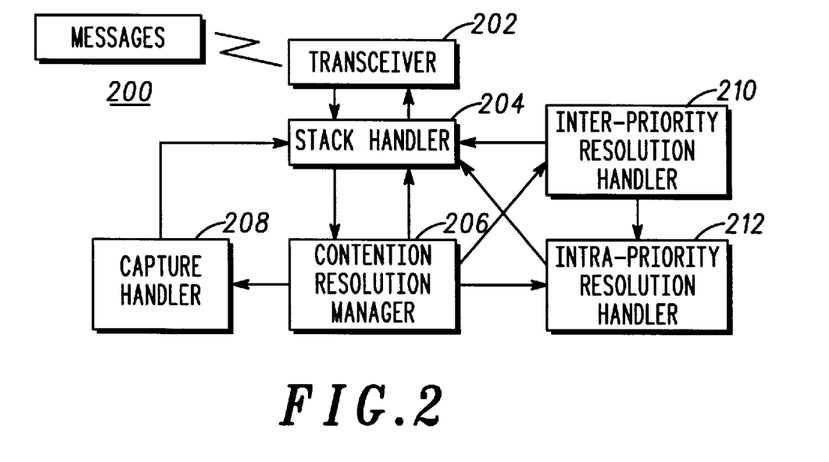
FIG. 2 shows a block diagram for a preferred embodiment of a system for prioritized multiple access using contention signatures in accordance with the present invention.

FIG. 2, numeral 200, shows a block diagram for a preferred embodiment of a system for prioritized multiple access using contention signatures in accordance with the present invention. Each user who shares the channel operates a replica of the system. A transceiver (202) is used to transmit and receive messages. A stack handler (204), coupled to the transceiver (202), a capture handler (208), an inter-priority resolution handler (210), and an intra-priority resolution handler (212), provides the transceiver (202) with a transmitting group vector for every reservation frame, so that the user knows when transmission of a reservation message is permitted. Upon receiving feedback information from the channel, the transceiver (202) passes the feedback information to the stack handler (204). A contention resolution manager (206), coupled to the stack handler (204), is used to determine an appropriate procedure for resolving each collision, based on the transmitting group and feedback information it receives from the stack handler. If there is no collision, the contention resolution manager (206) returns control to the stack handler (204). The inter-priority resolution handler (210), coupled to the contention resolution manager (206), is used to execute an inter-priority resolution procedure (or simply inter-priority procedure) when an inter-priority collision is detected. An intra-priority resolution handler (212), coupled to the contention resolution manager (206), and where selected, to the inter-priority resolution manager (210), is used to execute an intra-priority resolution procedure (or simply intra-priority procedure) when an intra-priority collision is detected. The capture handler (208), coupled to the contention manager (206), is used to execute a capture procedure when a capture is detected. The contention resolution manager (206) invokes the inter-priority, intra-priority, and capture procedures accordingly. An intra-priority procedure may also be invoked directly (214) by the inter-priority resolution handler (210). When a procedure is completed, the corresponding handler, i.e., the capture, inter-priority resolution or intra-priority resolution handler, returns control to the stack handler.

Figure 3:
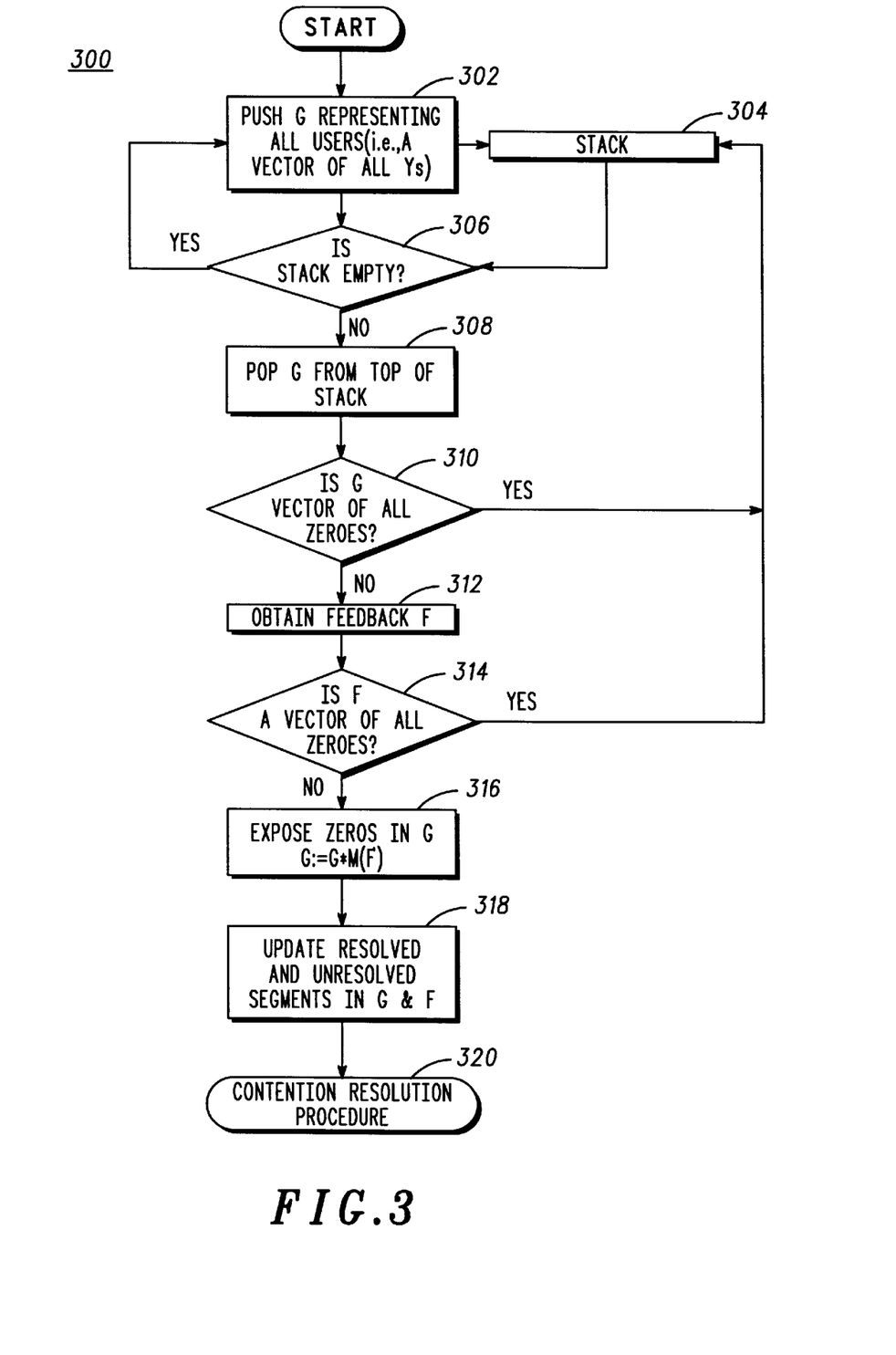
FIG. 3 shows a flow-chart for one embodiment of steps for the operation of a stack handler in a system for prioritized multiple access using contention signatures in accordance with the present invention.

FIG. 3, numeral 300, shows a flow-chart for one embodiment of the operation of a stack handler in a system for prioritized multiple access using contention signatures in accordance with the present invention. In the beginning, all users are allowed to participate (302) in contention for reserving data slots. Thus, a transmitting group vector with a Y in every digit is pushed onto the stack (304). Subsequently, whenever the stack becomes empty (306), implying that a contention resolution interval terminates, the stack handler recycles back (308) to pushing onto the stack a transmitting group vector with a Y in every digit.

If the stack is non-empty (306), the stack handler pops the transmitting group vector from the top of the stack (308) and proceeds with the following processing steps. When a transmitting group vector is popped off the stack, the vector is checked to determine if it is a null vector (310), i.e., one with every digit equal to zero. If the vector is a null vector, no contention signature matches this vector, and the algorithm proceeds to examine the stack for the next transmitting group vector (314). If the vector is not a null vector (310), all contending users whose contention signatures match this vector would transmit their reservation messages, i.e., provide feedback (312). If the resulting feedback vector is a null vector, it implies that there is no transmission in the present reservation frame, and the algorithm proceeds to examine the stack (304) for the next transmitting group vector. Otherwise, for every zero digit in the feedback vector, the corresponding digit in the transmitting group vector is set to zero, since all contending users belong to the group represented by G must have contention signatures with zeros in the same digits as those in F. These digits are exposed as soon as they are uncovered (316) to save unnecessary splitting later. The resolved and unresolved segments in the transmitting group vector and the feedback vector are then updated accordingly (318). At this stage, the algorithm is ready to execute a contention resolution procedure (320).

Figure 4:
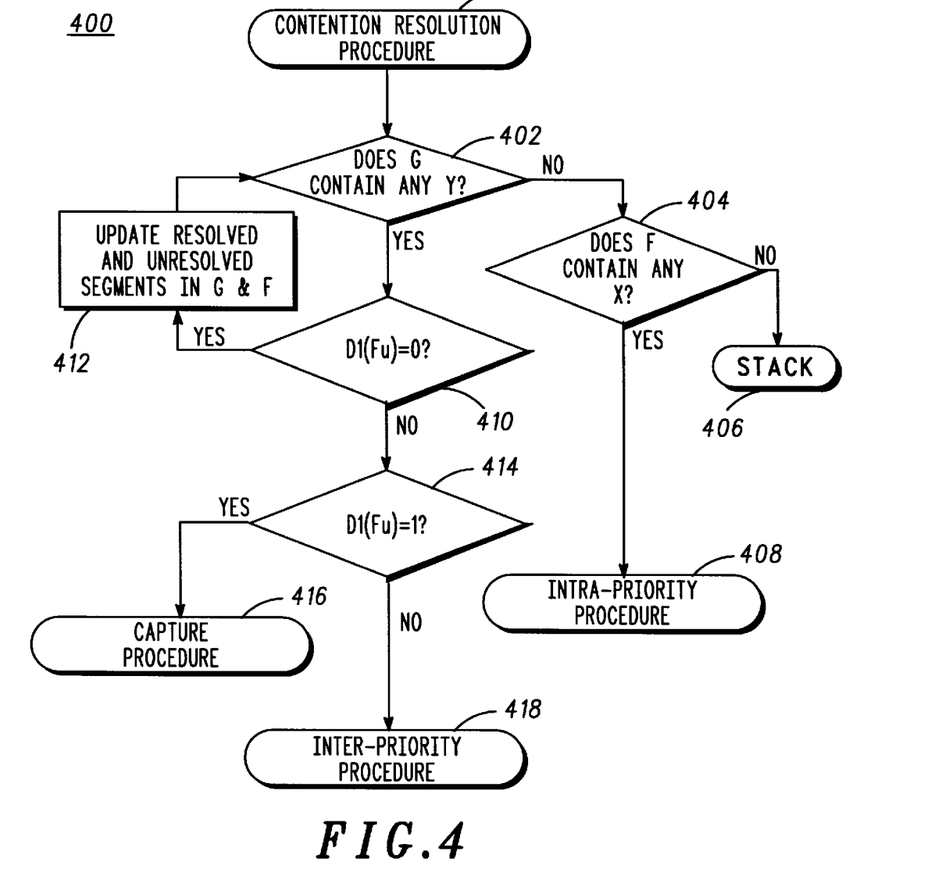
FIG. 4 shows a flow-chart for one embodiment of steps for the operation of a contention resolution manager in a system for prioritized multiple access using contention signatures in accordance with the present invention.

FIG. 4, numeral 400, shows a flow-chart for the operation of a contention resolution manager in a system for prioritized multiple access using contention signatures in accordance with the present invention. The contention resolution manager checks the transmitting group vector G for digits of value Y (402) to determine if there is any possibility for an inter-priority collision or a capture. If G contains no digit of value Y, there can only be an intra-priority collision, if indeed there is a collision. There cannot be any inter-priority collision involving users in the group because every one of them must have the same contention signature G. The contention resolution manager determines if there is a collision by checking for digits of value X (404) in the feedback vector F. If F contains no digit of value X, F must either be a string of all zeros, or F is the same as G. The first case implies a SILENCE, whereas the second case implies a SUCCESS. In either case, the procedure must stop, and the contention resolution manager returns control back to the stack handler (406). Otherwise, one may conclude that there is an intra-priority collision, and an intra-priority procedure is invoked (408).

When G contains at least one digit of value Y, there are three cases to consider depending on the value of the first digit of the unresolved segment $F^u$ of the feedback vector F. If that digit is zero (410), then the contention signatures of all contending users belonging to the group represented by G must have a 0 for the digit corresponding to the first digit of $F^u$. Note that this digit has already been exposed in a previous step by the stack handler. The resolved and unresolved segments in G and F are updated (412), such that each of the unresolved segments in G and F has its first digit transferred to its corresponding resolved segment. Subsequently, the contention resolution manager recycles back to checking the first digit of the updated unresolved segment of the feedback vector (402). If the first digit of the unresolved segment $F^u$ of the feedback vector F is 1 (414), then the contending user who is responsible for this digit of value 1 is the one with the highest priority among all contending users belonging to the transmitting group represented by G. Hence, a capture is detected, and a capture procedure is invoked (416). If the first digit of the unresolved segment $F^u$ of the feedback vector F is X, then there may be a collision among users with different priorities. An inter-priority procedure is then invoked (418).

Figure 5:
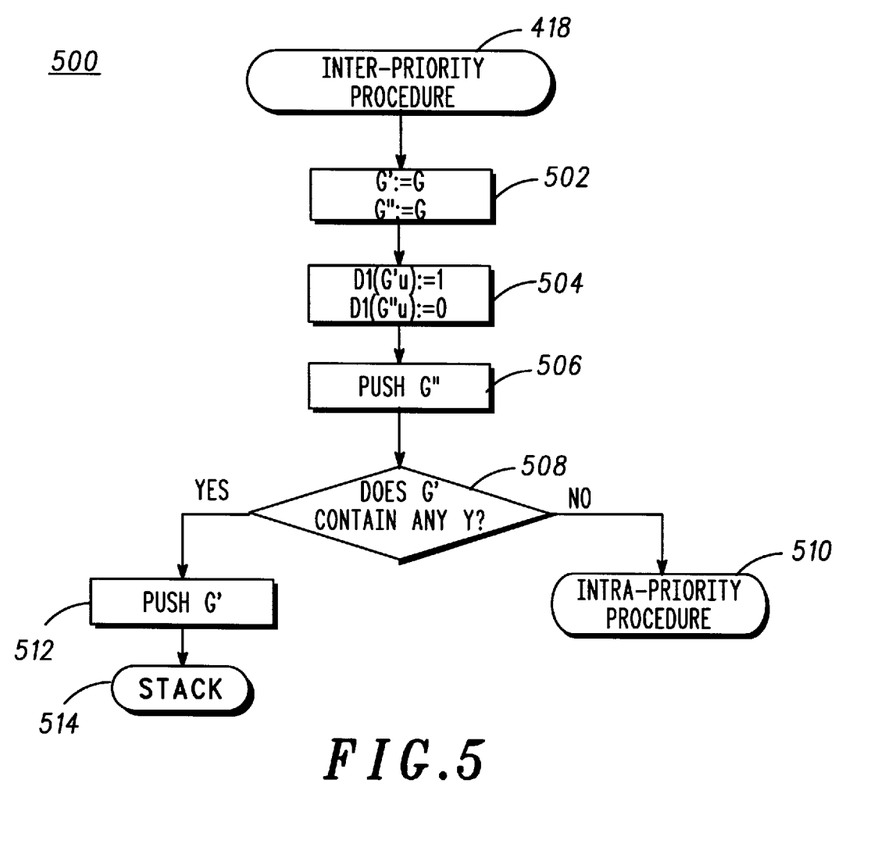
FIG. 5 shows a flow-chart for one embodiment of steps for the operation of an inter-priority resolution handler in a system for prioritized multiple access using contention signatures in accordance with the present invention.

FIG. 5, numeral 500, shows a flow-chart for one embodiment of the operation of an inter-priority resolution handler in a system for prioritized multiple access using contention signatures. The inter-priority resolution handler divides a group of contending users into two groups, G' and G", by distinguishing the first digit of the unresolved segment of the group vector G (502). G' is obtained by setting the value of that digit to 1, and G" is obtained by setting the value of that digit to 0 (504). Contending users whose contention signatures match G' obviously have higher priorities than those whose contention signatures match G". Thus, G" is first pushed onto the stack (506). If G" contains at least one digit of value Y (508), it is next pushed (512) onto the stack (514), and control is returned to the stack handler. If G' contains no digit with value Y (508), then there must have been an intra-priority collision involving users with contention signature that is the same as G'. Since an intra-priority collision is detected, an intra-priority procedure is invoked (510). Note that, when an intra-priority procedure is invoked by the inter-priority resolution handler, there is no need to let contending users in the current transmitting group associated with G' to retransmit, only to confirm a collision that is already anticipated. Hence, G' may be split immediately.

Figure 6:
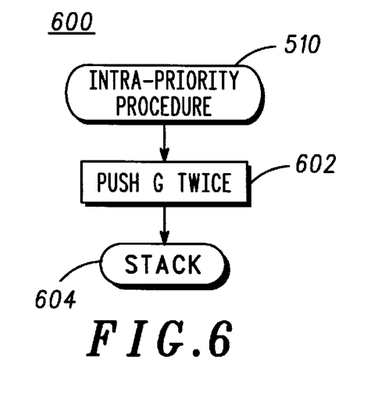
FIG. 6 shows a flow-chart for one embodiment of steps for the operation of an intra-priority resolution handler in a system for prioritized multiple access using contention signatures in accordance with the present invention.

FIG. 6, numeral 600, shows a flow-chart for the operation of the intra-priority resolution handler in the system for prioritized multiple access using contention signatures.

When an intra-priority procedure is invoked (510), there must have been an intra-priority collision involving users with contention signature that is the same as the current transmitting group vector G. The contending users are then split into a transmitting group and a non-transmitting group, both having the same vector as their parent group G. The transmitting group vector, G, and a replica of it are pushed (602) onto the stack (604). Control is then returned to the stack handler. When this procedure is executed, all contending users whose contention signatures match G randomly choose between the current reservation frame and the next reservation frame for transmission of their respective reservation messages.

Figure 7:
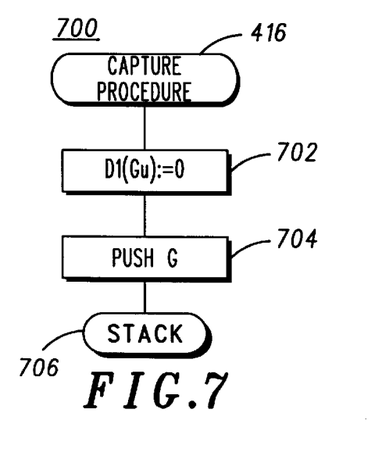
FIG. 7 shows a flow-chart for one embodiment of steps for the operation of a capture handler in a system for prioritized multiple access using contention signatures in accordance with the present invention.

FIG. 7, numeral 700, shows a flow-chart for the operation of the capture handler in the system for prioritized multiple access using contention signatures. When a capture procedure is invoked (416), the first digit of the unresolved segment of the transmitting group vector G is set to zero (702) since all feedback vectors corresponding to offspring group vectors derived from G will have value 0 in this digit. The modified group vector is then pushed (704) onto the stack (706), and control is returned to the stack handler.

An example for the application of the present invention is shown in Table 6. In this example, four users are involved in an initial collision in the first reservation frame. User 1 has a contention signature 1010. User 2 and User 3 have the same contention signature 0110. User 4 has a contention signature 0011. In each reservation frame, contending users whose contention signatures match the current transmitting group vector G are permitted to transmit their reservation messages. The content of the G stack in each reservation frame is shown in the second column of the table. All users are able to detect the feedback in each reservation frame. The last column of the table shows the feedback vector for each reservation frame. Note that the contention resolution interval for this example is 10 reservation frames.

In the first reservation frame, G=(YYYY) and all busy users are allowed to transmit their reservation messages. Whoever is responsible for the first digit of value 1 in the feedback vector 1XX1 clearly must be the contending user with the highest priority. Thus, User 1 captures the channel in reservation frame 1, and his contention signature is high-lighted to indicate a successful transmission. Since a user with a contention signature starting with 1 has captured the channel, all remaining contending users must have contention signatures starting with 0. Hence, the first digit of the current transmitting group vector G is set to zero, and the resulting group vector 0YYY is pushed onto the stack.

In the second reservation frame, the remaining three users enter into a collision because all their contention signatures match 0YYY. In this reservation frame, the first digit of F constitutes its resolved segment, and the remaining three digits constitute its unresolved segment. Since the first digit of the unresolved segment of F is X, an inter-priority collision might have occurred, and hence an inter-priority procedure is invoked. The current transmitting group is split into the next non-transmitting group 00YY and the next transmitting group 01YY.

The non-transmitting group in reservation frame 3 consists of all contending users with contention signatures starting with 00 and ending with any combinations of two binary digits. User 4, being in this group, refrains from transmission in reservation frame 3. The transmitting group in reservation frame 3 consists of all contending users with contention signatures starting with 01 and ending with any combinations of two binary digits. User 2 and User 3, being in this group, retransmit in this reservation frame. These two users enter into a collision since they have the same contention signature. Since the last digit of the feedback vector in reservation frame 3 is zero, the current transmitting group vector 01YY is replaced by 01Y0. In this reservation frame, the first two digits of F constitute its resolved segment, and the remaining two digits constitute its unresolved segment. Since the first digit of the unresolved segment of F is X, there is a potential inter-priority collision, and an inter-priority procedure is invoked. The feedback vector, 0XX0, shows that there must be at least two contending users with contention signature 0110 as well as an unknown number (possibly zero) of contending users with contention signature 0100. When the transmitting group with vector 01Y0 is split into the next transmitting group with vector 0110 and the next non-transmitting group with vector 0100, it is clear that the new transmitting group vector has no digit of value Y. An intra-priority collision is thus detected, and an intra-priority procedure is invoked. The group vector 0110 is then pushed twice onto the stack after the group vector 0100 is pushed. Note that the group vector 00YY remains at the bottom of the stack since a potential collision involving users whose contention signatures match 00YY is yet to be resolved.

In view of the intra-priority collision, User 3 and User 4 each randomly decides to retransmit in one of the next two reservation frames (i.e., either reservation frame 4 or reservation frame 5). By chance, they both decide to retransmit in reservation frame 5. Therefore, the reservation channel is silent in reservation frame 4, and User 2 and User 3 collide again in reservation frame 5. In the next two reservation frames (i.e., reservation frame 6 and reservation frame 7), the two colliding users finally manage to avoid each other as they happen to select different reservation frames to retransmit their respective reservation messages. Note that the above intra-priority contention resolution may take even more reservation frames to complete, but the likelihood that this happens decreases exponentially with the number of times of intra-priority group splitting.

In reservation frame 8, the transmitting group vector on the top of the stack is 0100. Since the remaining user to be granted permission to retransmit his reservation message has a contention signature different from 0100, there is a silence in this reservation frame.

In reservation frame 9, User 4 finally gets to retransmit. User 4 obviously knows that he has a successful transmission. However, other users cannot tell from the feedback vector 0011 whether there is a successful transmission due to a user whose contention signature is 0011, or there is an inter-priority collision involving a user with contention signature 0010 and another user with contention signature 0001. Hence, although User 4 may capture the channel, the next reservation frame in which users with contention signatures that match 0000Y are permitted to retransmit is necessary to confirm the capture and the completion of the present contention resolution interval

TABLE 6

Example of Prioritized Contention Resolution

| Reservation Frame | G Stack | User 1 | User 2 | User 3 | User 4 | F |
|---|---|---|---|---|---|---|
| 1 | YYYY | 1010 | 0110 | 0110 | 0011 | 1XX1 |
| 2 | 0YYY |  | 0110 | 0110 | 0011 | 0XX1 |

TABLE 6-continued

Example of Prioritized Contention Resolution

| Reservation Frame | G Stack | User 1 | User 2 | User 3 | User 4 | F |
|---|---|---|---|---|---|---|
| 3 | 01YY<br>00YY |  | 0110 | 0110 |  | 0XX0 |
| 4 | 0110<br>0110<br>0100<br>00YY |  |  |  |  | 0000 |
| 5 | 0110<br>0100<br>00YY |  | 0110 | 0110 |  | 0XX0 |
| 6 | 0110<br>0110<br>0100<br>00YY |  |  | 0110 |  | 0110 |
| 7 | 0110<br>0100<br>00YY |  | 0110 |  |  | 0110 |
| 8 | 0100<br>00YY |  |  |  |  | 0000 |
| 9 | 00YY |  |  |  | 0011 | 0011 |
| 10 | 000Y |  |  |  |  | 0000 |

The combined random/reservation multiple access (CCRMA) scheme introduced in [2] utilizes a scalable contention-based reservation subchannel to support a large population of bursty users. Nevertheless, it is not capable of providing differented quality of service to users of different priority classes. The present invention provides a different scalable contention-based reservation subchannel to support a large population of bursty users, as well as a prioritized contention resolution algorithm to accommodate users of different priority classes.

The existing binary tree splitting algorithm does not address prioritized multiple access. It is incorporated in the present invention only for intra-priority contention resolution. For inter-priority contention resolution, the present invention makes use of a non-trivial modification of the binary tree splitting algorithm. In accordance with the present invention, contention signatures are used to enable inter-priority collisions, intra-priority collisions, as well as capture events to be detectable by all users.

Conventional use of a stack for implementing a splitting algorithm is meant for contention resolution involving users without priority classification. The present invention extends the application of a stack in a non-obvious manner for implementing a prioritized splitting algorithm that support contention resolution involving users of different priorities.

The reservation mechanism for DSMA is strictly speaking based on a contention-free multiple access protocol. Although all users may dynamically share the first k bits of address prefix that is associated with priority, each user still maintains a unique n-bit address in each reservation frame, so that collisions are completely avoided. The present invention assigns a unique contention signature to each priority class, but all users in the same priority class share the same contention signature. Hence, a reservation frame for the present invention consists of a considerably smaller number of reservation slots than a reservation frame for DSMA. The operation of DSMA requires each user to transmit his unique address serially so that binary feedback after transmission of each bit of the address may be used by lower priority users to decide when to terminate further reservation in a reservation frame. The present invention does not require transmission of contention signatures serially, as long as ternary feedback for each reservation slot in a reservation frame is available to all users. Contending users do not rely on a serial detection of the feedback to avoid collision. Instead, a prioritized splitting algorithm is used to resolve collisions when there are multiple contending users transmitting in a reservation frame. In short, the present invention has a more scalable reservation mechanism than that of DSMA.

The various approaches for prioritized demand assignment multiple access described in [6] rely on serial transmission and feedback within each reservation frame. They are not scalable for a large population of prioritized users, especially in a communication system where propagation delay is not negligible. The present invention does not rely on serial transmission within each reservation frame. This permits the group of reservation slots within a reservation frame to be scheduled in a pipeline manner to minimize the degradation of performance due to propagation delay. In addition, the number of reservation slots per reservation frame is of a logarithmic order. Specifically, with N reservation slots, the present invention can support $2^N-1$ priority classes. Hence, the present invention is very scalable with respect to the number of priority classes.

CDMA relies on orthogonal codes to avoid collisions. However, the orthogonal codes do not readily favor any particular group of users over another group of users. The present invention, on the other hand, assigns contention signatures to users of different priority classes such that a contending user with a given priority is favored over other contending users with lower priorities. CDMA can perhaps be used to support users of different priority classes if a code book containing orthogonal codes is partitioned into mini code books so that each mini code book may be used by users of a different priority class. However, this method is not viable when the number of users is large compared to the number of orthogonal codes in the code book. The alternative that assigns an orthogonal code to each priority class amounts to a replication of a contention-based protocol for each priority class, and hence does not support dynamic reallocation of transmission resources among users of different priority classes. The present invention, on the other hand, supports dynamic reallocation of transmission resources among users of different priority classes by using contention signatures to implement a prioritized multiple access scheme.

Although one can support users of different priority classes by using multiple levels of power for transmission in certain conventional contention-base multiple access protocols, this approach is not scalable due to a practical limit on the number of possible power levels. Moreover, it requires costly transmitters as well as a complicated algorithm for determining a power level for transmission when users are geographically distributed such that power attenuation can be taken into consideration. The present invention does not require transmission of reservation messages at different power levels to attain capture for contention resolution. With power control, few priority classes may be supported due to physical limits. On the other hand, the present invention can support up to $2^N-1$ priority classes with N-digit contention signatures.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A system for prioritized multiple access using contention signatures in a communication system wherein each user among a plurality of users that share a channel operates a replica of the system, comprising:
   A) a transceiver, for transmitting and receiving messages from/to the plurality of users and for, upon receiving feedback information from the channel, passing the feedback information to a stack handler;
   B) the stack handler, coupled to the transceiver, a capture handler, a contention resolution manager, an inter-priority resolution handler, and an intra-priority resolution handler, for providing the transceiver with a transmitting group vector for a reservation frame to indicate to the user when transmission of a reservation message is permitted;
   C) the contention resolution manager, coupled to the stack handler, for, when a collision occurs, determining a procedure for resolving the collision based on a transmitting group and feedback information received from the stack handler,
      wherein, for non-collisions, the contention resolution manager returns control to the stack handler;
   D) the inter-priority resolution handler, coupled to the contention resolution manager, for executing an inter-priority procedure when an inter-priority collision is detected;
   E) the intra-priority resolution handler, coupled to the contention resolution manager, and where selected, to the inter-priority resolution handler, for executing an intra-priority resolution procedure when an intra-priority collision is detected;
   F) the capture handler, coupled to the contention manager, for executing a capture procedure when a capture is detected.

2. A method for prioritizing multiple access using contention signatures in a communication system wherein each user of a plurality of users that share a channel operates a replica of the system, comprising the steps of:
   A) transmitting and receiving, by a transceiver, messages from/to the plurality of users and for, upon receiving feedback information from the channel, passing the feedback information to a stack handler;
   B) providing, by the stack handler, the transceiver with a transmitting group vector for a reservation frame to indicate to the user when transmission of a reservation message is permitted;
   C) determining, by a contention resolution manager, when a collision occurs, a procedure for resolving the collision based on a transmitting group and feedback information received from the stack handler,
      wherein, for non-collisions, the contention resolution manager returns control to the stack handler;
   D) executing, by an inter-priority resolution handler, an inter-priority procedure when an inter-priority collision is detected;
   E) executing, by an intra-priority resolution handler, an intra-priority resolution procedure when an intra-priority collision is detected; and
   F) executing, by a capture handler, a capture procedure when a capture is detected.

3. The method of claim 2 wherein the operation of a stack handler in a communication system for prioritized multiple access using contention signatures, comprises the steps of:
   A) participating, by all users in contention for reserving data slots by pushing a transmitting group vector having a Y in every digit onto a stack where a digit of value Y in the transmitting group vector means that the digit may be matched by one of: a zero and a one in a contention signature, and any user whose contention signature has zeros and ones wherein each zero matches one of a Y and a zero, if any, and each one matches one of a Y and a one, if any, in the transmitting group vector, may transmit in a given reservation frame;
   B) returning, by the stack handler, whenever the stack becomes empty, to pushing onto the stack a transmitting group vector with a Y in every digit;
   C) popping, by the stack handler, when the stack is non-empty, the transmitting group vector from the top of the stack and proceeding with the following processing steps:
      C1) checking the transmitting group vector to determine if the transmitting group vector is a null vector, and
         C1a) where the vector is a null vector, proceeding to examine the stack for a next transmitting group vector;
         C1b) where the vector is a non-null vector, transmitting reservation messages by all contending users whose contention signatures match the transmitting group vector;
      and where a resulting feedback vector is a null vector, proceeding to examine the stack for a next transmitting group vector, and
      otherwise, for every zero digit in the feedback vector, setting a corresponding digit in the transmitting group vector to zero, exposing the uncovered zeros, and updating resolved and unresolved segments in the transmitting group vector and the feedback vector are then updated accordingly to prepare to execute a contention resolution procedure.

4. The method of claim 2 wherein the operation of the contention resolution manager in the communication system for prioritized multiple access using contention signatures, comprises the steps of:
   A) checking, by the contention resolution manager, a transmitting group vector G for digits of value Y to determine whether one of: an inter-priority collision and a capture may occur;
   B) where G contains no digit of value Y, determining that there can only be an intra-priority collision, if there is a collision;
   C) determining, by the contention resolution manager, whether there is a collision by checking for digits of value X in a feedback vector F wherein one of:
      C1) where F fails to have a digit of value X, F is determined to be a string of all zeros; and
      C2) F is the same as G; and for C1 and C2, stopping and returning control back to a stack handler by the contention resolution manager;
      C3) otherwise, determining that there is an intrapriority collision, and invoking a intra-priority procedure;
   D) determining, where G contains at least one digit of value Y, and:
      D1) where the digit of value Y is zero, determining that the contention signatures of all contending users belonging to a group represented by G have a 0 for the digit corresponding to the first digit of an unresolved segment $F''$, updating resolved and unresolved segments in G and F are updated wherein each of the unresolved segments in G and F has a first digit transferred to a corresponding resolved segment and returning by the contention resolution manager to checking the first digit of the updated unresolved segment of the feedback vector;

D2) where a first digit of the unresolved segment $F''$ of the feedback vector F is 1, detecting a capture and invoking a capture procedure;

D3) where the first digit of the unresolved segment $F''$ of the feedback vector F is X, determining that there may be a collision among users with different priorities and involving an inter-priority procedure.

5. The method of claim 2 wherein the operation of the interpriority resolution handler in the communication system for prioritized multiple access using contention signatures, comprises the steps of:

A) dividing, by the inter-priority resolution handler, a group of contending users into two groups, G' and G'', by distinguishing a first digit of an unresolved segment of a group vector G (502) wherein G' is obtained by setting a value indicating a high priority, and G'' is obtained by setting a value indicating a low priority;

B) pushing G'' onto a stack; and where G'' contains at least one digit of value Y, Y a predetermined value, returning control to a stack handler; and C) where G' fails to have a digit with value Y, determining that there has been an intra-priority collision involving users with a contention signature that is the same as G' and invoking an intra-priority procedure.

6. The method of claim 2 wherein the operation of the intra-priority resolution handler in the communication system for prioritized multiple access using contention signatures, comprises the steps of:

A) splitting contending users into a transmitting group and a non-transmitting group, both having the same vector as a parent group G; and B) pushing a transmitting group vector and a replica of the transmitting group vector onto the stack and returning control to a stack handler.

7. The method of claim 2 wherein the operation of the capture handler in the communication system for prioritized multiple access using contention signatures comprises the steps of:

A) setting, when a capture procedure is invoked, a first digit of an unresolved segment of a transmitting group vector G to zero to form a modified group vector;

B) pushing the modified group vector onto a stack, and returning control to the stack handler.

* * * * *